United States Patent Office 3,313,789
Patented Apr. 11, 1967

3,313,789
PRODUCTION OF ETHYLENE VINYL TERTIARY ALCOHOL COPOLYMERS
Herbert Naarmann, Ludwigshafen (Rhine), and Ernst-Guenther Kastning, Assenheim, Pfalz, Germany, assignors to Badische Anilin- & Soda-Fabrik Aktiengesellschaft, Germany
No Drawing. Filed July 15, 1963, Ser. No. 295,206
Claims priority, application Germany, July 20, 1962, B 68,113
4 Claims. (Cl. 260—80.5)

This invention relates to a process for the production of copolymers of ethylene which contain a hydroxyl groups.

It is known that telomers which are suitable as intermediates for the production of surfactants can be prepared from ethylene and allyl alcohol or methallyl alcohol using free radical forming catalysts, particularly hydrazine or derivatives of hydrazine, at temperatures of at least 200° C. and pressures of at least 500 atmospheres. In this prior art method, however, the yields of telomers are very low with reference to the amount of catalyst required, and separation of the telomers from the by-products offers difficulty. The telomers obtained have molecular weights of about 250. Copolymers having high molecular weight cannot be prepared by the said method, because allyl alcohol and methallyl alcohol exhibit a regulating and polymerization inhibiting effect. Not only allyl alcohol and methallyl alcohol, but also buten-1-ol-3 inhibits the polymerization of ethylene in the presence of free radical forming catalysts.

High molecular weight ethylene copolymers bearing hydroxyl groups may be prepared by the known method of saponifying copolymers of ethylene and vinyl acetate. This method is however very expensive industrially.

The object of this invention is to provide a process by which high molecular weight ethylene copolymers containing hydroxyl groups can be prepared in a simple way. Other objects of the invention will be apparent from the following description.

We have now found that copolymers of ethylene which contain hydroxyl groups can be prepared by polymerizing ethylene, optionally with other ethylenically unsaturated compounds amenable to free radical polymerization, using free radical forming catalysts at temperatures between 30° and 300° C. and pressures above 10 atmospheres in admixture with up to 50% by weight, with reference to the total amount of monomers, of an ethylenically unsaturated polymerizable alcohol having the general formula:

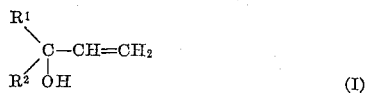

(I)

in which $R^1$ and $R^2$ represent hydrocarbon radicals which together may also be components of a carboxylic ring.

Suitable alcohols having the said general Formula I may be prepared in conventional ways, for example as described by W. Reppe et al., Annalen 596 (1955), 1–224, and E. Bergmann et al., J. Appl. Chem. 3 (1953), 39, by vinylation of ketones. The substituents $R^1$ and $R^2$ may represent the same or different hydrocarbon radicals. By hydrocarbon radicals we understand linear or branched alkyl groups and alkenyl groups, and also cycloalkyl, cycloalkenyl, aralkyl and aryl groups. Specifically the substituents $R^1$ and $R^2$ may be methyl, ethyl, isopropyl, pentyl, penten-4-yl, octyl, octen-6-yl, 2-ethylhexyl, dodecyl, cyclopentyl, cyclohexyl, cyclohexen-4-yl, cyclooctyl, cyclooctenyl, benzyl, p-methylbenzyl, phenyl, o-tolyl, p-tolyl and naphthyl groups. The substituents $R^1$ and $R^2$ preferably have together at least two and not more than twenty carbon atoms. Moreover the substituents $R^1$ and $R^2$ may together be components of a carbocyclic ring, particularly one containing five to ten carbon atoms. Examples of suitable ethylenically unsaturated alcohols are 3-methylbuten-1-ol-3, 3-methylpenten-1-ol-3, 3-methylhexen-1-ol-3, 3-methylhepten-1-ol-3, 3-phenylbuten-1-ol-3, 3-ethylpenten-1-ol-3, 3-phenylpenten-1-ol-3, diphenyl vinyl carbinol, 1-vinylcyclohexanol-1, 3-n-butylbuten-1-ol and 3-n-butylpenten-1-ol-3.

Ethylenically unsaturated alcohols having the general formula:

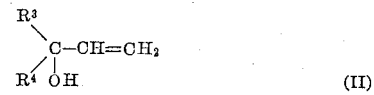

(II)

are preferred; in the formula, $R^3$ represents a linear or branched monovalent alkyl group having 1 to 7, particularly 1 to 5, carbon atoms, a cyclohexyl group or a phenyl group and $R^4$ represents a linear or branched alkyl group having 1 to 7, particularly 1 to 3, carbon atoms. Moreover $R^3$ and $R^4$ in the said formula may together represent a pentamethylene group ($-(CH_2)_5-$).

3-methylbuten-1-ol-3, 1-vinylcyclohexanol-1 and 3-phenylbuten-1-ol-3 are particularly suitable ethylenically unsaturated alcohols.

The proportion of such ethylenically unsaturated alcohols in the copolymerization is generally more than 1% by weight, preferably between 10 and 25% by weight with reference to the total amount of monomers.

Examples of suitable free radical forming catalysts are organic peroxides such as benzoyl peroxide, lauroyl peroxide, di-tertiary-butyl peroxide, tertiary-butyl hydroperoxide and tertiary-butyl perbenzoate, and also azo-bis-carboxylic nitriles, for example $\alpha,\alpha'$-azo-bis-isobutyronitrile, $\alpha,\alpha'$-azo-bis-cyclohexanecarboxylic nitrile, $\alpha,\alpha'$-azo-bis-iso-$\alpha,\delta$-dimethylbutyronitrile, and also azo-bis-carboxylic esters, such as methyl $\alpha,\alpha'$-azo-bis-isobutyrate, and azobiscarboxylic amides such as azo-bis-isobutyramide.

Other suitable free radical forming catalysts are redox systems, such as mixtures of potassium persulfate or ammonium persulfate and ascorbic acid or sodium hydrosulfite, or mixtures of benzoyl peroxide and dimethylaniline. In particular cases, oxygen is also suitable as a catalyst. The catalysts are generally used in amounts of between 0.05 and 5, preferably between 0.1 and 2% by weight with reference to the total amount of monomers.

Examples of ethylenically unsaturated compounds which are amenable to free radical polymerization and which may be used as additional comonomers for the copolymerization are vinyl esters, such as vinyl acetate, vinyl propionate, vinyl butyrate and vinyl isobutyrate, vinyl ethers, such as methyl vinyl ether, ethyl vinyl ether, butyl vinyl ether and allyl vinyl ether, acrylic acid, methacrylic acid and derivatives of acrylic and methacrylic acids, such as the methyl, ethyl and butyl esters, amides and N-methylolamides and also their ethers such as N-methylolacrylamide, N-methylolmethacrylamide, N-methylolacrylamide butyl ether, and N-methylolmethacrylamide butyl ether, vinyl sulfonic acids and their aryl esters, such as vinyl sulfonic acid phenyl ester, and also fumaric acid, maleic acid, itaconic acid and maleic anhydride. If such ethylenically unsaturated compounds are coemployed in the process, the proportion of ethylene with reference to the total amount of monomers should be at least 20% by weight.

Copolymerization of 50 to 99 parts by weight of ethylene with 1 to 49 parts by weight of an ethylenically unsaturated alcohol having the general Formula I and 49 to 2 parts by weight of an ethylenically unsaturated compound selected from the group consisting of vinyl esters of saturated aliphatic carboxylic acids containing 2 to 4 carbon atoms, acrylic acid and methacrylic acid and their esters with alkanols having 1 to 4 carbon atoms by the method of this invention is of particular interest. Ethylenically unsaturated alcohols having the general Formula II are preferred.

The process is generally carried out in emulsion or solution in autoclaves at temperatures between 30° and 300° C., preferably between 80° and 150° C., and pressures which are preferably between 150 and 600 atmospheres.

In particular cases, for example when using tubular reactors, the copolymerization may also be carried out in the absence of solvents or diluents and at pressures of more than 1000 up to about 3000 atmospheres at temperatures between 125° and 240° C.

It is also possible to carry out the copolymerization continuously in tubular reactors using the usual amounts of oxygen as a catalyst at pressures between 1000 and 3000 atmospheres and temperatures between about 160° and 300° C.

Generally it is advantageous to carry out the polymerization according to the invention at pressures between 80 and 3000 atmospheres and at temperatures between 50° and 240° C., particularly between 50° and 150° C.

Suitable solvents for use in the process are alcohols, such as methanol, ethanol, propanol, tertiary butanol, glycol and their carboxylic esters, such as ethyl acetate, and also ketones, for example acetone and methyl ethyl ketone, ethers, such as di-isobutyl ether, tetrahydrofuran and dioxane, and also cycloaliphatic and aromatic hydrocarbons, such as cyclohexane, benzene, toluene, xylene, ethylbenzene, isopropylbenzene and also formamide and dimethylformamide. Methanol, tertiary-butanol, benzene and cyclohexane are the preferred solvents.

High molecular weight ethylene copolymers bearing hydroxyl groups and having K-values between 17 and 100 are generally obtained by the process. Good yields are obtained, usually in a polymerization proceeding relatively rapidly. In particular cases it is also possible to prepare ethylene copolymers of low molecular weight. Ethylene copolymers prepared according to the invention have less tendency to electrostatic charging than polyethylene prepared by conventional methods. They may be mixed with other thermoplastics, such as polyethylene, polyacrylates, polyamides, copolymers of ethylene and vinyl acetate, and also with natural and synthetic rubber, cellulose acetate and fillers, such as diatomaceous earth, titanium dioxide and carbon black. The copolymers are suitable for improving paper and textiles, for the production of molded articles, surface coating materials and curable compositions. Chemical reactions may be carried out at their hydroxyl groups and the copolymers crosslinked for example by the action of diisocyanates or dicarboxylic acids.

The following examples will further illustrate the invention. The parts specified in the examples are parts by weight. The K-values specified therein—unless otherwise specified—have been determined by the method of H. Fikentscher, Cellulosechemie 13 (1932), 58 in cyclohexane at 25° C. or decahydronaphthalene at 130° C. The hydroxyl numbers given in the examples have been determined according to A. Verley-Fr. Bölsing, Houben-Weyl, volume 2, Analytical Methods, page 639 (1953).

EXAMPLE 1

A mixture of 20 parts of one of the ethylenically unsaturated alcohols specified below, 80 parts of methanol and 0.5 part of di-tertiary-butyl peroxide is heated in an autoclave to 115° C. under an ethylene pressure of 300 atmospheres and this temperature maintained for ten hours. The unsaturated alcohols used are:

A—3-methylbuten-1-ol-3
B—3-phenylbuten-1-ol-3
C—3-ethylpenten-1-ol-3
D—1-vinylcyclohexanol-1
E—3-methylocten-1-ol-3 and the results obtained after a conventional working up are given in the following Table 1:

TABLE 1

|  | A | B | C | D | E |
| --- | --- | --- | --- | --- | --- |
| Yield of polymer in parts | 63 | 66 | 64 | 55 | 58 |
| K-value | 28 | 28 | 26 | 18 | 21 |
| Hydroxyl number | 131 | 41 | 94 | 53 | 49 |

If allyl alcohol or buten-1-ol-3 be used instead of the ethylenically unsaturated alcohols used in Table 1, no polymerization is observed under otherwise identical conditions.

EXAMPLE 2

A mixture of 20 parts of one of the ethylenically unsaturated alcohols specified below, 80 parts of methanol and 0.5 part of lauroyl peroxide is heated in an autoclave to 70° C. under an ethylene pressure of 600 atmospheres and the reaction mixture is kept at this temperature for ten hours. After working up the reaction mixture conventionally, the results given in Table 2 are obtained. The unsaturated alcohols used are:

A—3-methylbuten-1-ol-3
B—3-phenylbuten-1-ol-3
C—3-ethylpenten-1-ol-3
D—1-vinylcyclohexanol-1
E—3-methylocten-1-ol-3

TABLE 2

|  | A | B | C | D | E |
| --- | --- | --- | --- | --- | --- |
| Yield of polymer in parts | 82 | 87 | 85 | 62 | 69 |
| K-value | 48 | 41 | 51 | 45 | 40 |
| Hydroxyl number | 147 | 52 | 105 | 75 | 66 |

By using buten-1-ol-3 or allyl alcohol instead of the ethylenically unsaturated alcohols given in the Table 2, only 1 or 3 parts of polymer is obtained under otherwise identical conditions.

EXAMPLE 3

A mixture of 50 parts of 3-methylpenten-1-ol-3, 280 parts of tertiary-butanol and 1 part of lauroyl peroxide is heated for ten hours at 85° C. under an ethylene pressure of 600 atmospheres. The reaction mixture is worked up conventionally and 120 parts of a copolymer is obtained having a softening range of 102° to 105° C. and a melt viscosity at 120° C. of 4000 cp. K-value 54. Hydroxyl number 312.

EXAMPLE 4

A mixture of 10 parts of 3-methylbuten-1-ol-3, 200 parts of benzene and 0.5 part of azo-bis-isobutyronitrile is heated for eight hours under an ethylene pressure of 300 atmospheres at 75° C. A copolymer is obtained having a K-value of 39 and a hydroxyl number of 57.

The copolymer can be crosslinked with diisocyanates. For example with hexamethylene diisocyanate in the molar ratio 1:1 at 100° C. it forms a plastic composition with slowly cures.

EXAMPLE 5

Into a packed tubular reactor which is under an ethylene pressure of 300 atmospheres and whose temperature is kept at 115° C., a solution of 100 parts of 3-methylbuten-1-ol-3 and 10 parts of acrylic acid in 20,000 parts of methanol and, separately therefrom, a solution of 5 parts of ditertiary-butyl peroxide and 1 part of azo-bis-isobutyronitrile in 5000 parts of methanol are pumped per hour in such a way that the solutions trickle down the packing. A copolymer which softens at 75° to 81° C., whose K-value is 21 and whose melt viscosity at 120° C. is 650 cp. is obtained at the rate of 1800 parts per hour. It has a hydroxyl number of 560 and an acid number of 62.

The copolymer may be mixed with high and low pressure polyethylenes to decrease their tendency to become charged electrostatically.

EXAMPLE 6

A solution of 1 part of lauroyl peroxide in 50 parts of benzene is passed while stirring at 75° C. during the course of five hours into a mixture of 20 parts of 3-phenylbuten-1-ol-3, 80 parts of vinyl acetate and 500 parts of benzene which is under an ethylene pressure of 300 atmospheres. Polymerization is carried on for another three hours at 75° C. and the product is then worked up by a conventional method. 125 parts of a copolymer is obtained which has a K-value of 25 and a hydroxyl number of 35. It is readily soluble in dimethylformamide, benzene, xylene, dimethylcyclohexane and cyclohexane and is suitable for addition to surface coating compositions.

EXAMPLE 7

A mixture of 57 parts of 3,4-dimethylpenten-1-ol-3 and 2 parts of ditertiary-butyl peroxide is heated at 120° C. for eight hours at an ethylene pressure of 600 atmospheres. 180 parts of a copolymer is obtained which has a K-value of 43 and a hydroxyl number of 63. It softens between 98° and 102° C. The copolymer has practically no tendency to static charging, is suitable as an additive for surface coating compositions and can be crosslinked in the melt, for example with tolyl diisocyanate.

EXAMPLE 8

A mixture of 75 parts of 3-phenylbuten-1-ol-3 and 1 part of lauroyl peroxide is heated for five hours at 100° C. at an ethylene pressure of 1800 atmospheres. 210 parts of a copolymer is obtained which has a K-value of 62 and a hydroxyl number of 168.

The copolymer may be crosslinked, for example with hexamethylene diisocyanate, to form a product which is insoluble in the usual solvents.

It is also possible to prepare vulcanizable substances from the copolymer for example by treatment with acids. For example if 10 parts of the copolymer which has a hydrogenation number of 0 be treated with 2 parts of 20% acetic acid for two hours at 100° C., a compound is obtained having the hydrogenation number 1.45 and which can be vulcanized for example with sulfur.

EXAMPLE 9

A solution of 2 parts of potassium persulfate in 400 parts of water is gradually added during the course of eight hours at an ethylene pressure of 300 atmospheres at 85° C. to a mixture of 16 parts of 3-methylbuten-1-ol-3, 174 parts of vinyl acetate, 4 parts of sodium hydrogen phosphate, 6 parts of sodium phosphate and 7.5 parts of a commercially available emulsifier. A dispersion is obtained containing 30% by weight of a copolymer which has a K-value of 44, a hydroxyl number of 72 and a softening point of 21° C.

Elastic and clear films may be prepared from the dispersion. It is suitable for the production of coatings.

EXAMPLE 10

A mixture of 50 parts of 3-isobutylbuten-1-ol-3 and 0.1 part of azo-bis-isobutyronitrile is heated at 60° C. for three hours at an ethylene pressure of 2600 atmospheres. 156 parts of a copolymer is obtained which has a K-value of 73.5 (measured in 1% solution in decahydronaphthalene) and which contains 29% by weight of the unsaturated alcohol in polymerized form.

EXAMPLE 11

A mixture of 30 parts of 3-n-butylbuten-1-ol-3, 220 parts of n-butyl acrylate, 500 parts of cyclohexane and 1 part of azo-bis-isobutyronitrile is heated at 60° C. for five hours under an ethylene pressure of 100 atmospheres in an autoclave. 283.5 parts of a copolymer is obtained which has a K-value of 38 (measured in 1% solution in a mixture of equal parts of dioxane and toluene) and which contains 10.6% by weight of unsaturated alcohol and 11.7% by weight of ethylene in polymerized form.

By working as described above but with 1 part of ditertiary-butyl peroxide as polymerization catalyst and at 125° C., 305 parts of a copolymer having a K-value of 24 is obtained. The proportion of unsaturated alcohol in polymerized form in this case is 9.8% by weight and that of ethylene 18% by weight. This copolymer can be crosslinked with diisocyanates. By adding the same amount of hexamethylene diisocyanate and 3% by weight of water (with reference to the total amount of polymer and diisocyanate) a soft plastic foam can be prepared therefrom.

EXAMPLE 12

A mixture of 50 parts of 3-cyclohexylbuten-1-ol-3, 50 parts of vinyl acetate and 0.2 part of azo-bis-isobutyronitrile is heated at 65° C. for five hours at an ethylene pressure of 2100 atmospheres. 198 parts of a copolymer is obtained which has a K-value of 69.5 (measured in 1% solution in decahydronaphthalene) and which contains 23% by weight of unsaturated alcohol in polymerized form.

If 0.2 part of oxazolidone hydroperoxide be used as catalyst instead of azo-bis-isobutyronitrile and the polymerization carried out at 160° C., 219 parts of a copolymer is obtained which has a K-value of 61.

We claim:

1. A process for the production of copolymers of ethylene containing hydroxy groups wherein ethylene is copolymerized with 1 to 50% by weight of an ethylenically unsaturated alcohol at a pressure between 10 and 3000 atmospheres at a temperature between 30 and 300° C. using a free radical forming polymerization catalyst, said unsaturated alcohol having the general formula

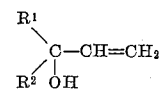

in which $R^1$ and $R^2$ stand for hydrocarbon radicals having together 2 to 20 carbon atoms, said hydrocarbon radicals being selected from the group consisting of alkyl, alkenyl, cycloalkyl, cycloalkenyl, aralkyl, and aryl and where $R^1$ and $R^2$ may together form a carbocyclic ring containing 5 to 10 carbon atoms.

2. A process as claimed in claim 1 wherein ethylene is copolymerized with 1 to 50% by weight of an ethylenically unsaturated alcohol at a pressure between 80 and 3000 atmospheres and a temperature between 50 and 240° C. using a free radical forming polymerization catalyst, said unsaturated alcohol having the general formula

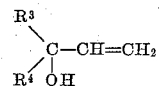

in which $R^3$ stands for a substituent selected from the group consisting of straight chain and branched monovalent alkyl groups containing from 1 to 7 carbon atoms, a cyclohexyl group and a phenyl group, and $R^4$ stands for a substituent selected from the group consisting of straight chain and branched monovalent alkyl groups containing from 1 to 7 carbon atoms, and in which $R^3$ and $R^4$ together can also be a pentamethylene group.

3. A process as claimed in claim 1 wherein ethylene is copolymerized with 10 to 25% by weight of an ethylenically unsaturated alcohol at a pressure between 80 and 3000 atmospheres and a temperature between 50 and 240° C. using a free radical forming polymerization catalyst, said unsaturated alcohol having the general formula

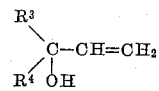

in which $R^3$ stands for a substituent selected from the group consisting of straight chain and branched monovalent alkyl groups containing from 1 to 7 carbon atoms, a cyclohexyl group and a phenyl group, and R$^4$ stands for a substituent selected from the group consisting of straight chain and branched monovalent alkyl groups containing from 1 to 7 carbon atoms, and in which R$^3$ and R$^4$ together can also be a pentamethylene group.

4. A process as claimed in claim 1, wherein 50 to 99 parts by weight of ethylene are copolymerized with 1 to 49 parts by weight of an ethylenically unsaturated alcohol and 49 to 2 parts by weight of an ethylenically unsaturated compound at a pressure between 80 and 3000 atmospheres and a temperature between 50 and 240° C. using a free radical forming polymerization catalyst, said unsaturated alcohol having the general formula

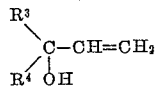

in which R$^3$ stands for a substituent selected from the group consisting of straight chain and branched monovalent alkyl groups containing from 1 to 7 carbon atoms, a cyclohexyl group and a phenyl group, and R$^4$ stands for a substituent selected from the group consisting of straight chain and branched monovalent alkyl groups containing from 1 to 7 carbon atoms, and in which R$^3$ and R$^4$ together can also be a pentamethylene group, and said ethylenically unsaturated compound being selected from the group consisting of vinyl esters of saturated aliphatic carboxylic acids containing 2 to 4 carbon atoms, acrylic acid and methacrylic acid and esters of acrylic and methacrylic acids with alkanols containing 1 to 4 carbon atoms.

References Cited by the Examiner
UNITED STATES PATENTS 2,450,234  9/1948  Evans et al. _____ 260—80.5
3,156,674  11/1964  Shokal et al. _____ 260—80.5

FOREIGN PATENTS 495,962  9/1953  Canada.

JOSEPH L. SCHOFER, *Primary Examiner.*

H. WONG, *Assistant Examiner.*

Notice of Adverse Decision in Interference

In Interference No. 96,198 involving Patent No. 3,313,789, H. Naarmann and E. G. Kastning, Production of ethylene vinyl tertiary alcohol copolymers, final judgment adverse to the patentees was rendered Jan. 3, 1969, as to claims 1, 2 and 3.

[*Official Gazette March 11, 1969.*]